United States Patent
Adams et al.

(10) Patent No.: US 10,061,913 B2
(45) Date of Patent: Aug. 28, 2018

(54) SLIDER AUTHENTICATOR

(71) Applicant: BlackBerry Limited, Waterloo (CA)

(72) Inventors: Neil Adams, Waterloo (CA); Chang Ming Liu, Waterloo (CA)

(73) Assignee: BlackBerry Limited, Waterloo (CA)

(*) Notice: Subject to any disclaimer, the term of this patent is extended or adjusted under 35 U.S.C. 154(b) by 149 days.

(21) Appl. No.: 15/056,292

(22) Filed: Feb. 29, 2016

(65) Prior Publication Data

US 2017/0249454 A1  Aug. 31, 2017

(51) Int. Cl.
| | |
|---|---|
| *G06F 21/00* | (2013.01) |
| *G06F 21/44* | (2013.01) |
| *G06F 21/45* | (2013.01) |
| *G06F 21/36* | (2013.01) |

(52) U.S. Cl.
CPC .............. *G06F 21/44* (2013.01); *G06F 21/36* (2013.01); *G06F 21/45* (2013.01); *G06F 2221/2141* (2013.01)

(58) Field of Classification Search
CPC ........ H04W 12/06; G06F 21/44; G06F 21/31; G06F 21/36; G06F 21/45; G06F 2221/2141

USPC ........................................................ 726/17
See application file for complete search history.

(56) References Cited

U.S. PATENT DOCUMENTS

| | | | |
|---|---|---|---|
| 8,311,530 B2 | 11/2012 | Kornilovsky et al. | |
| 8,577,356 B2 | 11/2013 | Kornilovsky et al. | |
| 9,064,104 B2 | 6/2015 | Riddiford | |
| 2012/0167199 A1 | 6/2012 | Riddiford | |
| 2013/0333020 A1* | 12/2013 | Deshpande | G06F 21/36 726/16 |
| 2015/0248547 A1 | 9/2015 | Riddiford | |

FOREIGN PATENT DOCUMENTS

| | | |
|---|---|---|
| EP | 1953663 | 8/2008 |
| EP | 2207124 | 7/2010 |
| WO | 2010146352 | 12/2010 |
| WO | 2010146353 | 12/2010 |

* cited by examiner

*Primary Examiner* — Yogesh Paliwal
(74) *Attorney, Agent, or Firm* — Ridout & Maybee LLP

(57) ABSTRACT

For a device with a slider component, movement of the slider component may be used as part of an authentication process, for example, when unlocking the device, or a portion thereof, or providing user authentication to an application executed on the device.

19 Claims, 6 Drawing Sheets

US 10,061,913 B2

SLIDER AUTHENTICATOR

FIELD

The present application relates generally to authentication for access to a device and, more specifically, to authentication for access to a device that has a first component that slides relative to a second component.

BACKGROUND

As each generation of smartphone becomes more important to the day-to-day life of individual users, protection of the often-sensitive data contained on a smartphone becomes increasingly important. Such protection is typically provided by securing a smartphone with one or more forms of authentication. That is, a user must successfully complete an authentication process to be granted access to the smartphone.

BRIEF DESCRIPTION OF THE DRAWINGS

Reference will now be made, by way of example, to the accompanying drawings which show example implementations; and in which.

DETAILED DESCRIPTION

For a device with a slider component, translational movement of the slider component may be used as part of an authentication process, for example, when unlocking the device, or a portion thereof, or providing user authentication to an application executed on the device.

According to an aspect of the present disclosure, there is provided a method of authentication for a computing device having a first component and a second component. The method includes receiving a candidate sequence, the candidate sequence formed responsive to a sequence of movements of the first component relative to the second component, determining whether the candidate sequence matches a previously established template sequence and responsive to the determining, controlling access to the computing device. In other aspects of the present application, a processor is provided for carrying out this method and a non-transitory computer readable medium is provided for adapting a processor in a mobile computing device to carry out this method.

Other aspects and features of the present disclosure will become apparent to those of ordinary skill in the art upon review of the following description of specific implementations of the disclosure in conjunction with the accompanying figures.

Figure 1:
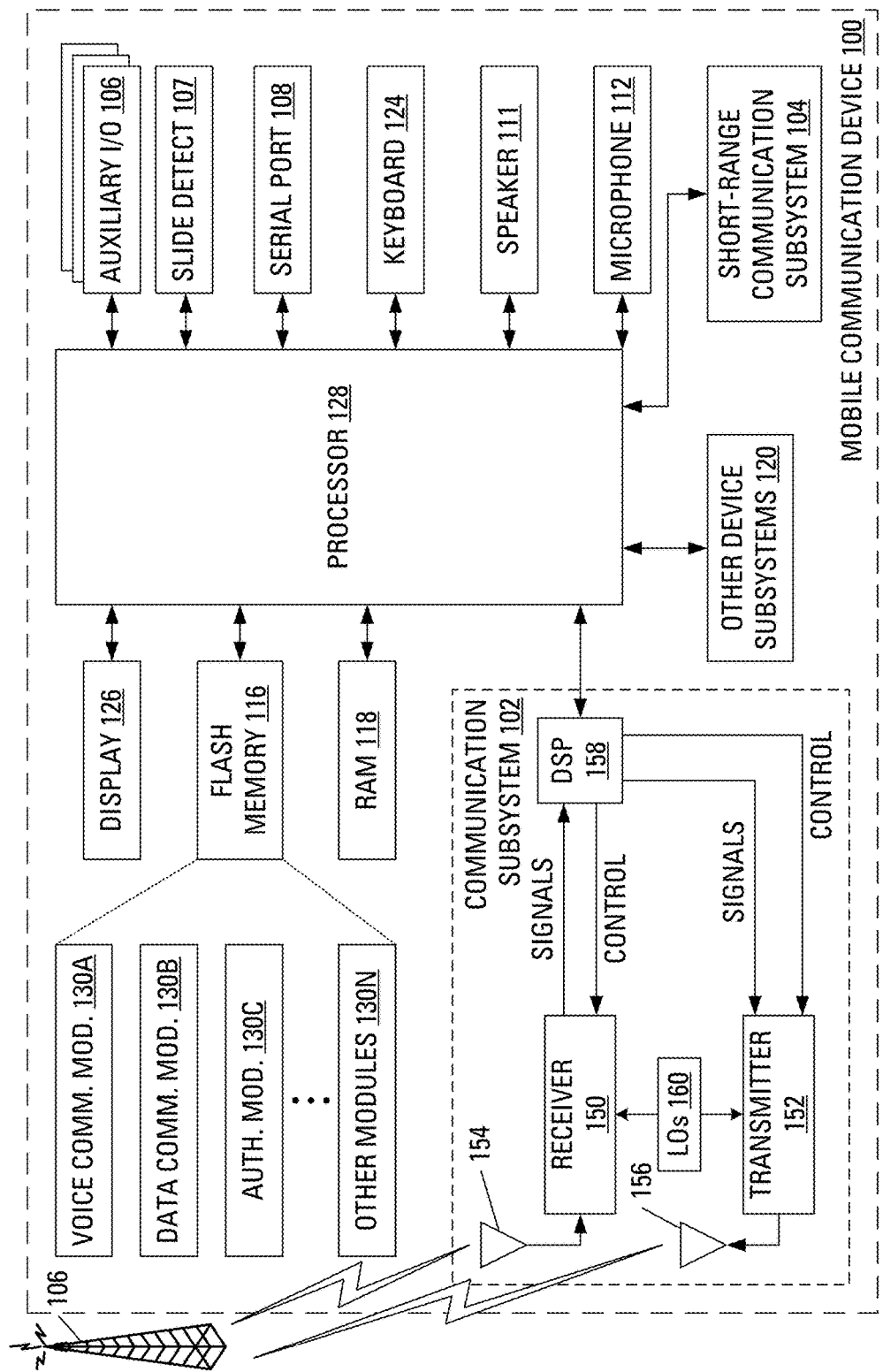
FIG. 1 illustrates a computing device as an example of a device that may carry out aspects of the present application.

FIG. 1 illustrates a computing device 100 as an example of a computing device that may carry out aspects of the present disclosure. The computing device 100 may comprise a housing, an input device (e.g., a keyboard 124 having a plurality of keys) and an output device. The output device may comprise two or more output devices. For example, the output device may be implemented as a display portion 126. The display portion 126 may comprise full graphic, or full color, Liquid Crystal Display (LCD). In some embodiments, the display portion 126 may comprise a touch screen display. In such embodiments, the keyboard 124 may comprise a virtual keyboard. Other types of output devices may alternatively be utilized. A processing device (a microprocessor 128) is shown schematically in FIG. 1 as coupled between the keyboard 124 and the display portion 126. The microprocessor 128 controls the operation of the display portion 126, as well as the overall operation of the computing device 100, in part, responsive to actuation of the keys on the keyboard 124 by a user.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 128, other optional parts of the computing device 100 are shown schematically in FIG. 1. These may include a communications subsystem 102, a short-range communications subsystem 104, the keyboard 124 and the display portion 126. The computing device 100 may further include other input/output devices, such as a set of auxiliary I/O devices 106, a serial port 108, a speaker 111 and a microphone 112. The computing device 100 may further include memory devices including a flash memory 116 and a Random Access Memory (RAM) 118 and various other device subsystems 120. The computing device 100 may comprise a two-way radio frequency (RF) communication device having voice and data communication capabilities. In addition, the computing device 100 may have the capability to communicate with other computer systems via the Internet.

Operating system software executed by the microprocessor 128 may be stored in a non-transitory computer readable medium, such as the flash memory 116, but may be stored in other types of memory devices, such as a read only memory (ROM) or similar storage component. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the computing device 100. A set of software applications that control basic device operations, such as a voice communications module 130A and a data communications module 130B, may be installed on the computing device 100 during manufacture. An authentication module 130C may also be installed on the computing device 100 during manufacture, to implement, through execution by the microprocessor 128, aspects of the present disclosure. As well, additional software modules, illustrated as other software modules 130N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and optionally voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the computing device 100 is intended to operate. For example, the communication subsystem 102 of the computing device 100 may be designed to operate with the General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the computing device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in GPRS networks, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the computing device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the microprocessor 128. The received signal is then further processed by the microprocessor 128 for output to the display portion 126, or alternatively to some auxiliary I/O devices 106. A device user may also compose data items, such as e-mail messages, using the keyboard 124 and/or some other auxiliary I/O device 106, such as a touchpad, a rocker switch, a thumb-wheel, a trackball, a touch screen, or some other type of input device. The composed data items may then be transmitted over the wireless carrier network 170 via the communication subsystem 102.

In an optional voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the computing device 100. In addition, the display portion 126 may also be utilized in voice communication mode, for example, to display the identity of a calling party, the duration of a voice call, or other voice call related information.

The short-range communications subsystem 104 enables communication between the computing device 100 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication (NFC) module, etc.

Figure 2:
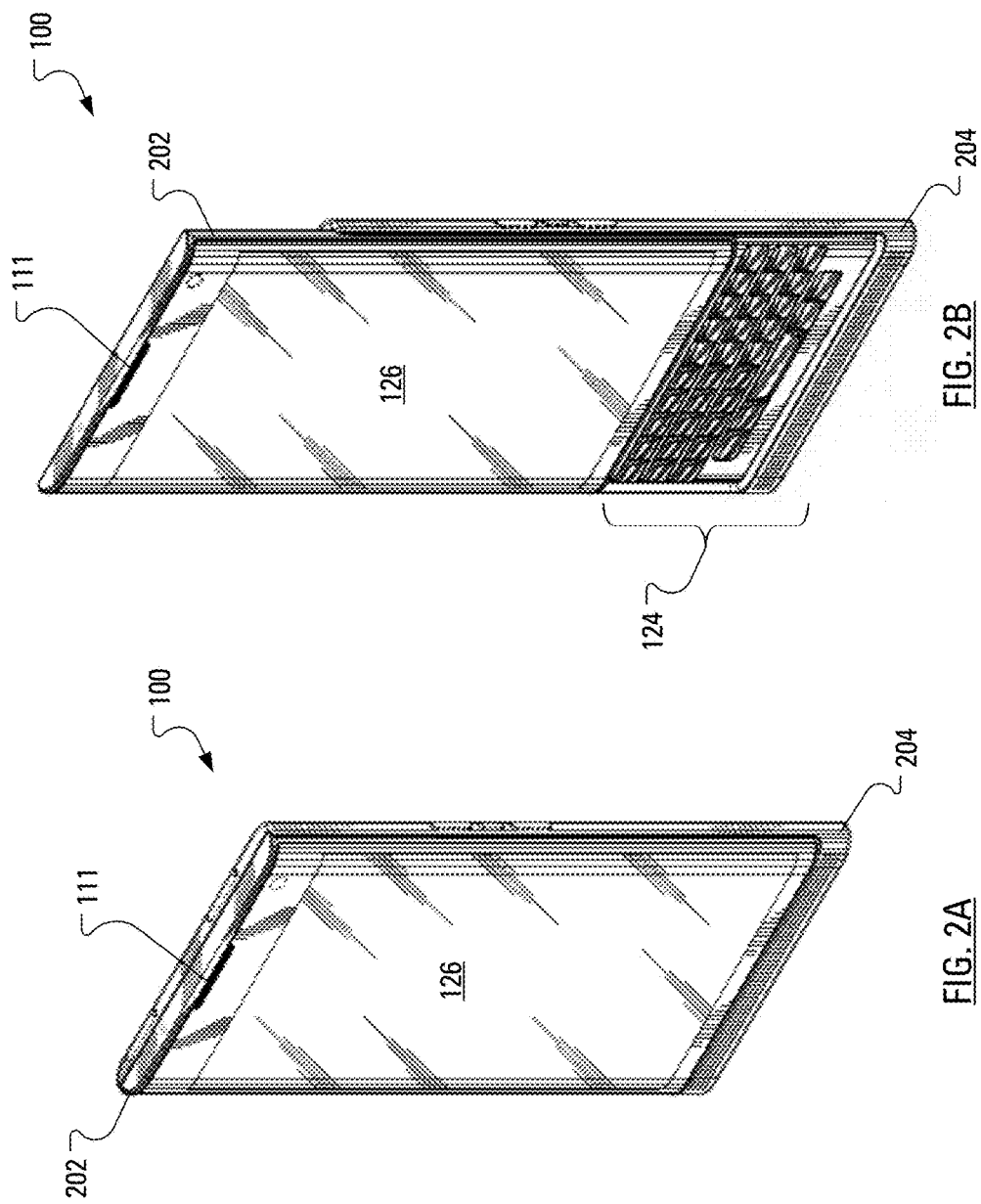
FIG. 2A illustrates, in perspective view, the mobile communication device of FIG. 1 with a first component and a second component in a first relative position in accordance with an aspect of the present application.
FIG. 2B illustrates, in perspective view, the mobile communication device of FIG. 1 with a first component and a second component in a second relative position in accordance with an aspect of the present application.

FIG. 2A illustrates, in right, front perspective view, the computing device 100 in a fully closed state. In particular, a first component 202 of the computing device 100 is evident in FIG. 2A. The first component 202 includes the display 126 and the speaker 111. FIG. 2B illustrates, in right, front perspective view, the computing device 100 in a fully open state. In the fully open state, a second component 204 of the computing device 100 is more evident. The second component 204 includes the keyboard 124. Indeed, the keyboard 124 is revealed responsive to a sliding of the first component 202 relative to the second component 204.

Notably, the computing device 100, as illustrated in FIG. 1, includes a set of auxiliary I/O devices 106. In the context of the computing device 100, as illustrated in FIGS. 2A and 2B to include the first component 202 and the second component 204, at least one of the auxiliary I/O devices 106 may include a slider detector 107 that functions to detect a direction of translational movement of the first component 202 relative to the second component 204. The slider detector 107 may also function to detect a position of the first component 202 relative to the second component 204.

In one example, the slider detector 107 may detect the position as an extent to which the first component 202 has been extended toward full extension. The extent may be expressed, for example, as a percentage of fully extended, as a percentage open, as a percentage closed, as a distance extended, as meeting a threshold of extension, as within a particular range of extension, or any other manner capabale of indicating the extent.

The slider detector 107 may detect, for example, that the first component 202 is being extended and is approximately 25% of fully extended.

Figure 3:
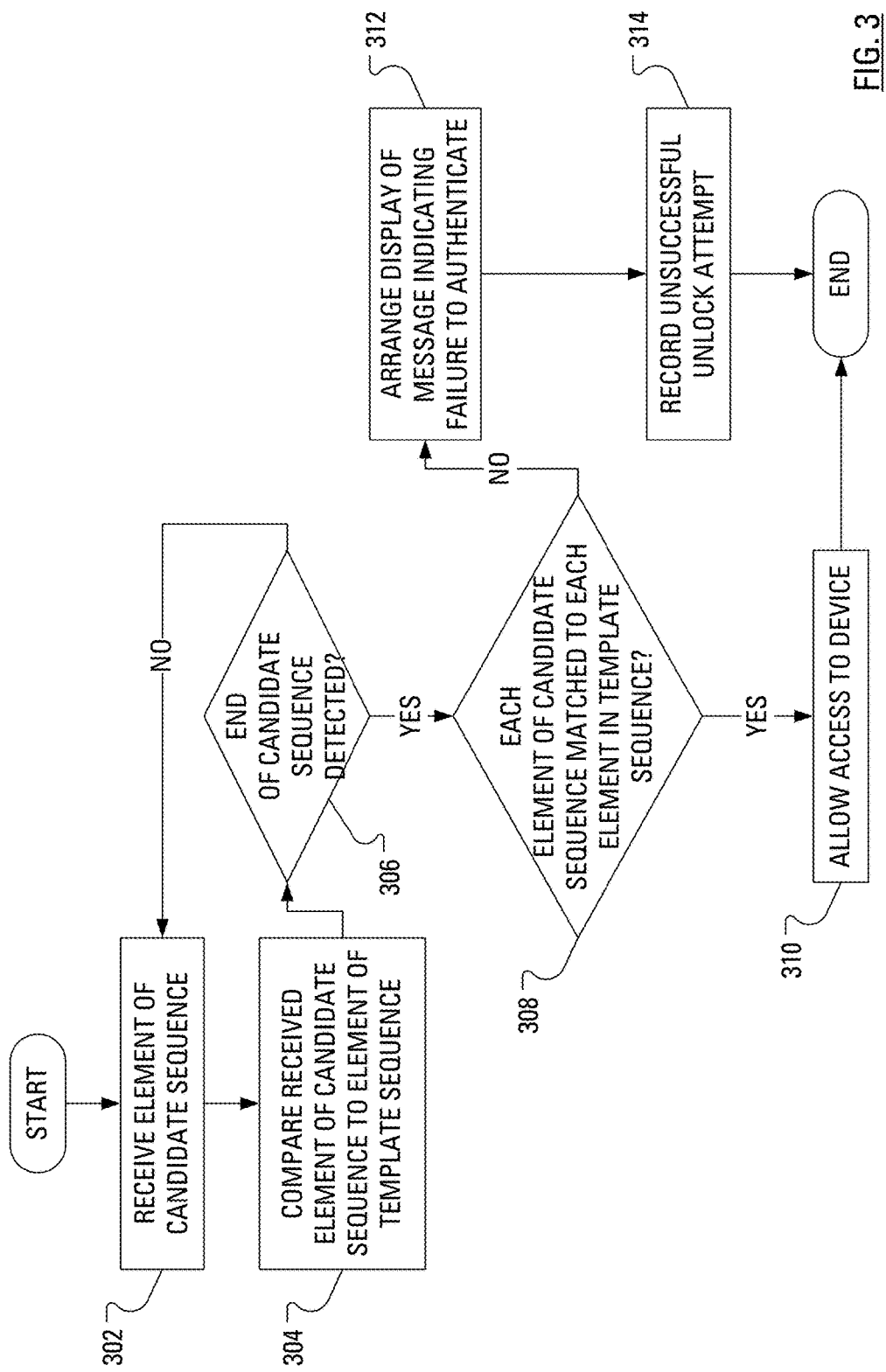
FIG. 3 illustrates example steps in a method of authenticating a user in accordance with an aspect of the present application.

In operation of aspects of the present application, and in view of FIG. 3, initially, the authentication module 130C may receive (step 302), from the slider detector 107, while the authentication module 130C is being executed by the microprocessor 128, a candidate element of a candidate sequence of movements of the first component 202. Responsive to receiving (step 302) the candidate element of the candidate sequence, the authentication module 130C may compare (step 304) the candidate element to a template element of a template sequence.

In typical, password-based authentication schemes, responsive to user configuration of a new password (referred to as a template password in the present disclosure), the template password is subjected to a hashing algorithm. The output of the hashing algorithm, a hashed version of the template password, is then stored. Subsequently, responsive to receiving a candidate password, the candidate password is subjected to the same hashing algorithm, and the output of the hashing algorithm, a hashed version of the candidate password, is compared to the hashed version of the template password. A match found between the two hashed passwords leads to authentication. Advantageously, by storing a hashed version of the template password, an unauthorized review of the memory of the device does not reveal the template password in plain text.

Elements of a template sequence of movements of the first component 202 relative to the second component 204 are, generally, more complex than the elements (for example, ASCII characters, such as letters, numbers, punctuation marks, and other characters) of typical passwords. In contrast to the elements of typical passwords, as an example, elements of a template sequence of movements may include: extend to approximately 75% open; pause approximately 500 milliseconds; and retract to approximately 25% open. Accordingly, it may be considered difficult to subject a template sequence of movements to a hashing algorithm. In one aspect of the present disclosure, a raw version of a template sequence of movements may be stored in a secure area of device memory 116, 118. The secure area of device memory 116, 118 may be accomplished using a Trusted Execution Environment (TEE). A TEE generally comprises a secure area of the main processor of a smart phone (or any connected device including tablets, set-top boxes and televisions). A TEE is designed such that code and data loaded into the TEE are protected with respect to confidentiality and integrity.

The format of entry of elements of the candidate sequence lends itself to a comparison scheme that operates on an element-by-element basis, as illustrated in FIG. 3, rather than the typical password comparison scheme, wherein a candidate password is not compared to a template password until the complete candidate password has been entered. The authentication module 130C may store a result (e.g., pass/fail) of the comparison (step 304) of the candidate element to a template element of a template sequence. It should be clear that indicating failure to authenticate immediately following entry of a candidate element that does not match the corresponding template element is associated with reduced security.

Subsequent to the comparing (step 304), the authentication module 130C may determine (step 306) whether the end of the candidate sequence has been detected. Determining (step 306) whether the end of the candidate sequence has been detected may be accomplished in multiple ways, familiar to those with secure electronic devices.

In one example embodiment, the template sequence may comprise a particular quantity, n, of template elements. In one illustrative example, n is four. Accordingly, upon having received (step 302) and compared (step 304) the quantity of received candidate elements as being equal to the quantity n of template elements (four, in one example), the authentication module 130C may determine (step 306) that the end of the candidate sequence has been detected.

In another example embodiment, the template sequence may comprise a sequence of template elements configured by a user or an administrator. An interface provided on the display 126 may include a button or other object corresponding to "OK". Accordingly, upon receiving an indication of a button press event, voice input, or other user input corresponding to "OK," the authentication module 130C may determine (step 306) that the end of the candidate sequence has been detected. Other user input similar to "OK" may be used to indicate the end of the candidate sequence, such as "Done" or "Enter" or a user input corresponding to an enter key, among others. The interface may also optionally provide a button or other object corresponding to "Cancel" or "Exit" to cancel or exit the candidate sequence.

Responsive to determining (step 306) that the end of the candidate sequence has not been detected, the authentication module 130C may receive (step 302) a further candidate element and compare (step 304) the candidate element to a template element of the template sequence.

Responsive to determining (step 306) that the end of the candidate sequence has been detected, the authentication module 130C may determine (step 308) whether each candidate element of the candidate sequence has been successfully matched to a corresponding template element in the template sequence, established in a configuration stage. Upon determining (step 308) that the candidate sequence has been successfully matched to the template sequence, the authentication module 130C may allow access (step 310) to the computing device 100. Upon determining (step 308) that one or more candidate elements in the candidate sequence have not been successfully matched to corresponding template elements of the template sequence, the authentication module 130C may arrange (step 312) display of a message indicating a failure to authenticate. The message may, for example, be arranged to be displayed on the display 126. Further responsive to determining (step 308) that one or more candidate elements in the candidate sequence have not been successfully matched to corresponding template elements of the template sequence, the authentication module 130C may record (step 314) an unsuccessful unlock attempt. A count of unsuccessful unlock attempts may be used to limit a specific quantity of unsuccessful unlock attempts.

The user may, for example, configure the template sequence, which may also be called an "unlock code," to be: up, to approximately 75% of fully extended; down, to approximately 15% of fully extended; up, to approximately 50% of fully extended; pause for approximately 500 milliseconds; and then, down to approximately 0% of fully extended (i.e., fully closed). In one embodiment, the rows of keys on the keyboard 124 may be used to correspond to the various percentages. On a "qwerty" keyboard, for example, the keyboard may include a top row, which has a key associated with the Q character on the left; the next row down, which has a key associated with the A character on the left, may be called "the A row"; the next row down, which has a key associated with the Z character on the left, may be called "the Z row"; and the bottom row, which has the spacebar key in the middle. In other embodiments, the keyboard may have a different configuration and may comprise fewer or more rows of keys.

In some embodiments, the degree of full extension may correspond to the position of the bottom of the first component 202 relative to the rows of keys. In one example, to achieve 75% of fully extended, the first component 202 must be in a position in which the bottom of the first component 202 is in substantially line with the top of the A row of the keyboard 124. To achieve approximately 50% of fully extended, the first component 202 must be in a position in which the bottom of the first component 202 is substantially in line with the middle of the Z row of the keyboard 124. To achieve approximately 25% of fully extended, the first component 202 must be in a position in which the bottom of the first component 202 is substantially in line with the middle of the spacebar row of the keyboard 124.

In another example, placement of the bottom of the first component 202 anywhere in the region of the first row of keys (such as the bottom row) may correspond to a first degree of full extension, while placement anywhere in the region of the second row of keys may correspond to a second degree of full extension. Likewise, placement anywhere in the region of the third row of keys may correspond to a third degree of full extension, and placement anywhere in the region of the fourth row of keys (e.g., the top row) may correspond to a fourth degree of full extension. Placement between two rows of keys may correspond to yet another degree of full extension.

Figure 4:
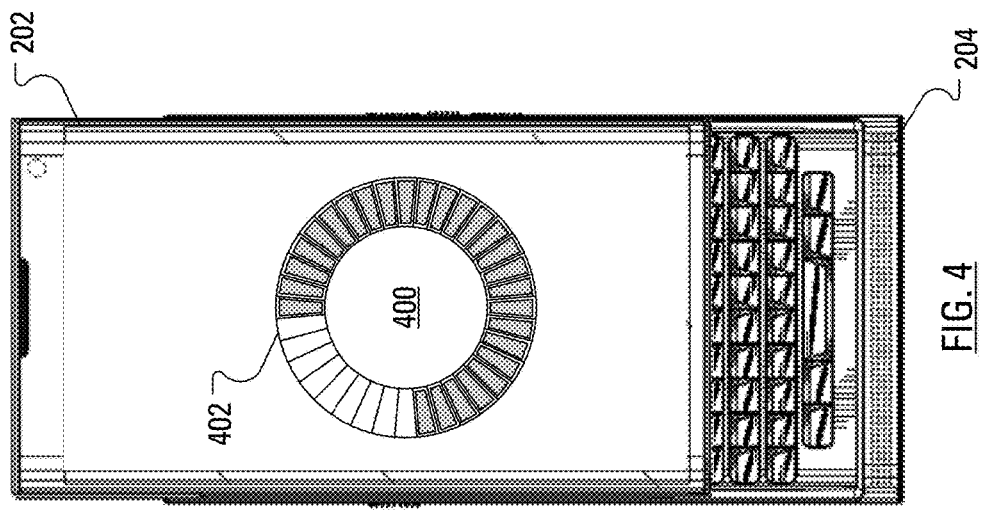
FIG. 4 illustrates the mobile communication device of FIG. 1 in a moment an authentication procedure of a first type in accordance with an aspect of the present application.
Figure 5:
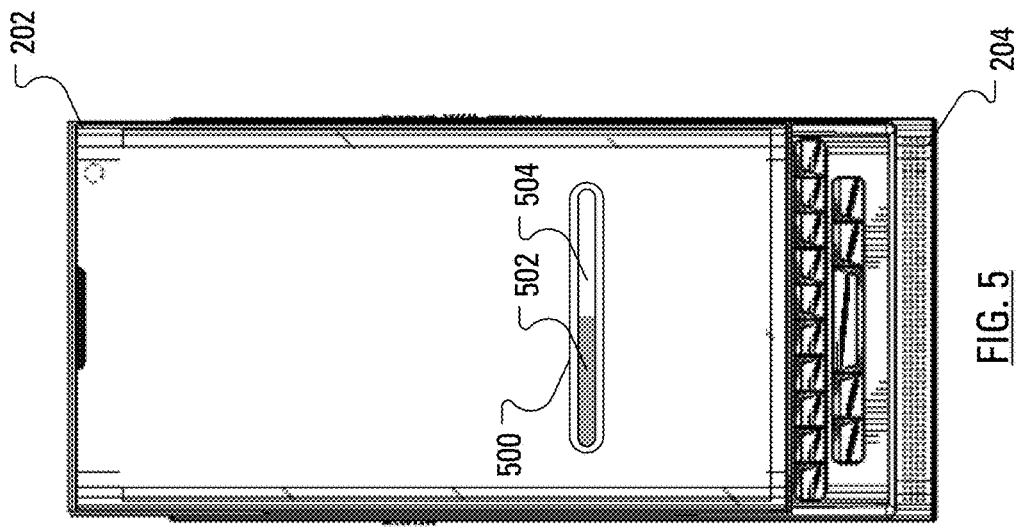
FIG. 5 illustrates the mobile communication device of FIG. 1 in a moment an authentication procedure of a second type in accordance with an aspect of the present application.
Figure 6:
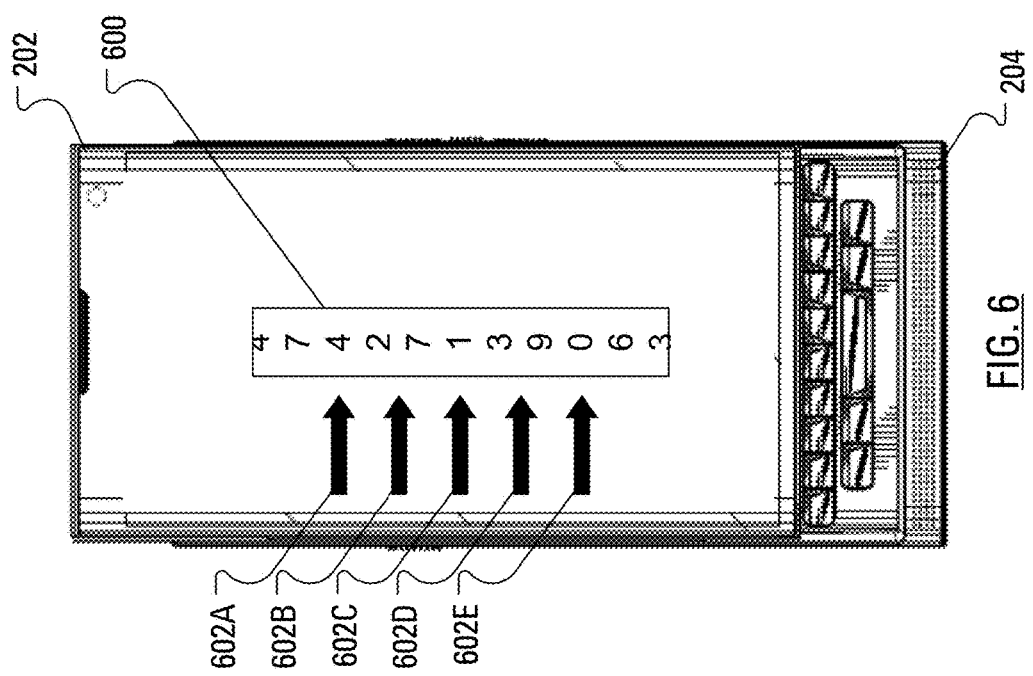
FIG. 6 illustrates the mobile communication device of FIG. 1 in a moment an authentication procedure of a third type in accordance with an aspect of the present application.

In some embodiments, the rows of keys are substantially horizontal as shown in FIGS. 4-6. In other embodiments, the rows of keys may be angled or otherwise disposed so as to not be substantially horizontal. In such embodiments, any of the individual keys may be used to correspond to the various degrees of full extension.

In some embodiments, a template element of the template sequence for a particular user may include an extension of the first component 202 to approximately X % of fully extended. The authentication module 130 may receive (step 302) and indication that the first component 202 has been extended to Y %. When determining (step 304) whether Y % in the candidate sequence matches the approximately X % of fully extended in the template sequence, the authentication module 130 may accept, as correct, any value of Y % in a range extending from X %–N % to X %+N %. In one embodiment, the precision of extensions within the candidate sequence relative to the template sequence may be configurable. That is, the N % value may be configurable. When the authentication module 130 is configured with a relatively small N %, an onus is placed on the user to be more precise than when the authentication module 130 is configured with a relatively large N %.

Similarly, a template element of the template sequence for a particular user may include a pause in the movement of the first component 202 of an approximately A millisecond duration. The authentication module 130 may receive (step 302) and indication that the first component 202 has been still for B milliseconds. When determining (step 304) whether B milliseconds matches approximately A milliseconds in the template sequence, the authentication module 130 may accept, as correct, any value of B milliseconds in a range extending from A–M milliseconds to A+M milliseconds. In some embodiments, the precision of pause durations in the candidate sequence relative to the template sequence may be configurable. That is, the M milliseconds value may be configurable. When the authentication module 130 is configured with a relatively small M, an onus is placed on the user to be more precise than when the authentication module 130 is configured with a relatively large M.

In a case wherein display 126 comprises a touch screen display 126, an entropy of the template sequence may be increased. Indeed, the template sequence may be configured to associate each movement of the 202 a sequence of movements of the first component 202 with concurrent finger presses on the touch screen display 126.

While receiving configuration of a template sequence the computing device 100 may detect a touch on the touch screen 126 while detecting that the first component 202 has been extended. Similarly, the computing device 100 may detect a touch on the touch screen 126 while detecting that the first component 202 is being retracted. The computing device 100 may, further, detect a touch on the touch screen 126 while detecting movements of the first component 202.

Rather than relying on the judgment of the user using the rows of keys on the keyboard 124 as a guide to judge the various percentages, the computing device 100, more particularly, the microprocessor 128, may be configured to use the display 126 to provide a visual aid to the user.

In a first example of a visual aid, illustrated in FIG. 4, the microprocessor 128 may be configured to use the display 126 to show a user interface comprising wheel 400. The wheel 400, as illustrated in FIG. 4, includes 36 individual sections, an example one of which is associated with reference numeral 402. Responsive to receiving, from the slider detector 106, frequent updates regarding an extent of extension of the first component 202, the microprocessor 128 may update the wheel 400 to fill in individual sections 402 to convey, to the user, a representation of the extent of extension of the first component 202 toward fully extended. When the first component 202 is fully extended, the microprocessor 128 may update the wheel 400 to fill in all of the individual sections 402. When the first component 202 is fully closed, the microprocessor 128 may update the wheel 400 to fill in none of the individual sections 402. In FIG. 4, 27 of the 36 individual sections 402 are filled in, thereby indicating that the first component 202 is approximately extended to 75% of fully extended. As illustrated, the individual sections 402 are filled in a clockwise manner as the first component 202 is extended. In contrast, the computing device 100 may be configured such that the individual sections 402 are filled in a counter-clockwise manner as the first component 202 is extended.

To assist a user in calibrating a pause in movement of the first component 202, the microprocessor 128 may update the wheel 400 periodically, such as, for example, approximately every 500 milliseconds, to change the color used to fill in the individual sections 402. That is, in the case wherein a template element of the template sequence is a 1500 millisecond pause, the user may await three color changes before causing the first component 202 to make the next movement.

In a second example of a visual aid, illustrated in FIG. 5, the microprocessor 128 may be configured to use the display 126 to show a user interface comprising bar 500. The bar 500 may be configured to have a plurality of sections including a first section 502 and a second section 504, with the sum of the two sections 502, 504 filling the bar 500.

Responsive to receiving, from the slider detector 106, frequent updates regarding an extent of extension of the first component 202, the microprocessor 128 may update the proportion of the bar 500 that is occupied by the first section 502 and, consequently, the proportion of the bar 500 that is occupied by the second section 504. The proportion of the bar 500 that is occupied by the first section 502 may convey, to the user, a representation of the extent of extension of the first component 202 toward fully extended. When the first component 202 is fully extended, the microprocessor 128 may update the bar 500 to only include the first section 502. When the first component 202 is fully closed, the microprocessor 128 may update the bar 500 to only include the second section 504. In FIG. 5, the first section 502 appears to occupy approximately 50% of the bar 500, thereby indicating that the first component 202 is extended to approximately 50% of fully extended.

As illustrated, the first section 502 is to the left of the second section 504. Accordingly, as the first component 202 is extended toward fully extended, a border between the first section 502 and the second section 504 moves left to right. Additionally, as the first component 202 is retracted toward fully closed, the border between the first section 502 and the second section 504 moves right to left. In another case, wherein the first section 502 is to the right of the second section 504, as the first component 202 is extended toward fully extended, the border between the first section 502 and the second section 504 moves right to left. It follows that as the first component 202 is retracted toward fully closed, the border between the first section 502 and the second section 504 moves left to right.

In a third example of a visual aid, illustrated in FIG. 6, the microprocessor 128 may be configured to use the display 126 to show a user interface comprising box 600. The box 600 may surround a column of elements. In FIG. 6, the elements comprise numbers. Beside the box 600 may be one or more alignment guides. FIG. 6 illustrates five arrows 602A, 602B, 602C, 602D, 602E (collectively or individually 602) as alignment guides. Notably, there is no intention, herein, to limit the quantity of alignment guides to five. Indeed, aspects of the present application may be achieved using a single alignment guide. Additionally, there is no intention, herein, to limit the number of elements in the box 600 to the 11 elements illustrated in FIG. 6. Furthermore, there is no intention, herein, to limit the frequency of appearance of individual elements in the box 600. For example, in FIG. 6, the elements 3, 4 and 7 appear twice, elements 0, 1, 2, 6 and 9 appear once and elements 5 and 8 (assuming a 0-9 elements set) do not appear at all.

It has been discussed hereinbefore that a user may establish, in a configuration stage, an unlock code as a template sequence of movements of the first component 202. For use with the embodiment illustrated in FIG. 6, the user may also establish, in the configuration stage, a sequence of numbers. The user may further select, in the configuration stage, a particular one of the alignment guides 602, in those cases wherein there is more than one alignment guide, thereby establishing a selected alignment guide.

Responsive to receiving, from the slider detector 106, frequent updates regarding an extent of extension of the first component 202, the microprocessor 128 may animate the column of numbers inside the box 600 so that the column of numbers moves up and down responsive to movements of the first component 202. In one embodiment, the animation of the column of numbers may be arranged such that it appears, to the user, that the position of the column of numbers is fixed relative to the second component 204.

Accordingly, as the user manipulates the first component 202 to extend the first component 202 toward fully extended, the column of numbers moves down in the box 600. That is, in the example of FIG. 6, as the user manipulates the first component 202 to extend the first component 202 toward fully extended, the number 4 at the top of the box 600 will become more completely visible. Additionally, the number 3, at the bottom of the box 600, will become less visible. Furthermore, in the example of FIG. 6, as the user manipulates the first component 202 toward fully closed, the number 4 at the top of the box 600 will become less visible and the number 3, at the bottom of the box 600, will become more visible.

Through such manipulation, the user may align a particular number in the box 600 with the selected alignment guide 602. User may repeat aligning a particular number in the box 600 with the selected alignment guide 602 until the user has completed entry of sequence of numbers established in the configuration stage.

For compatibility with aspects of the present disclosure presented hereinbefore, the microprocessor 128 may configure the column of numbers to appear in the box 600 such that movements of the first component that correspond to the template sequence of movements also result in alignment of successive numbers in the user's established sequence of numbers with the selected alignment guide. For example, consider the case wherein the first movement of the template sequence is up, to approximately 75% of fully extended, the user's established sequence of numbers is 4321 and the selected alignment guide is the top alignment guide 602A. For this example, the microprocessor 128 may configure the column of numbers to appear in the box 600 such that movement of the first component 202 up, to approximately 75% of fully extended, causes the number "4" to align with the top alignment guide 602A.

In another aspect of the present application, the column of numbers that appear in the box 600 may be selected at random by the microprocessor 128 each time the microprocessor 128 is called upon to produce the visual aid of FIG. 6. In this aspect, a user may configure, in a manner consistent with password or Personal Identification Number (PIN) configuration, a template sequence of numbers. Security may be seen to be enhanced in that, due to the random arrangement of numbers in the box 600, each time the user enters a candidate sequence of numbers to unlock the computing device 100, the user manipulates the first element 202 in a distinct sequence of movements.

Advantageously, when there are multiple alignment guides 602, it is difficult for an over-the-shoulder observer to know whether the user is, for one example, acting to align the top alignment guide 602A with the number "4" or, for another example, acting to align the bottom alignment guide 602E with the number "0."

Although numbers are illustrated as example elements in the box 600, aspects of the present disclosure will operate equally well when, instead of numbers, the elements are letters, characters, icons, emoticons/emoji or other objects.

The above-described implementations of the present disclosure are intended to be examples only. Alterations, modifications and variations may be effected to the particular implementations by those skilled in the art without departing from the scope of the application, which is defined by the claims appended hereto.

What is claimed is:

1. A method of authentication of a computing device having a first component and a second component, the method comprising:

receiving a candidate sequence, the candidate sequence formed responsive to a sequence of movements of the first component relative to the second component;

controlling a display to provide visual representation of the movements of the first component, wherein the visual representation includes a graphical user interface element in which a column of elements is displayed;

animating the column of elements to move within the graphical user interface element responsive to the movement of the first component;

determining whether the candidate sequence matches a previously established template sequence; and responsive to the determining, controlling access to the computing device.

2. The method of claim 1 wherein the graphical user interface element is divided into a plurality of sections.

3. The method of claim 1 wherein the graphical user interface element is divided into two sections.

4. The method of claim 1 wherein the elements comprise any one or more of the following: numbers, letters, characters, icons, emoticons, or objects.

5. The method of claim 1 wherein the controlling the display to provide visual representation of the movements comprises producing the column of elements in a random order.

6. The method of claim 1 wherein the movements comprise translational movements.

7. A computing device comprising:
a display;
a first component;
a second component;
a processor configured to:
receive a candidate sequence, the candidate sequence formed responsive to a sequence of movements of the first component relative to the second component;
control the display to provide visual representation of the movements of the first component, wherein the visual representation includes a graphical user interface element in which a column of elements is displayed;
animate the column of elements to move within the graphical user interface element responsive to the movement of the first component;
determine whether the candidate sequence matches a previously established template sequence; and
controlling access to the computing device.

8. The computing device of claim 7 wherein the graphical user interface element is divided into a plurality of sections.

9. The computing device of claim 7 wherein the graphical user interface element is divided into two sections.

10. The computing device of claim 7 wherein the elements comprise any one or more of the following: numbers, letters, characters, icons, emoticons, or objects.

11. The computing device of claim 7 wherein the processor is further configured to produce the column of elements in a random order.

12. The computing device of claim 7 wherein the processor is further configured to detect the movements of the first component relative to the second component.

13. The computing device of claim 7 wherein the movements comprise translational movements.

14. A non-transitory computer readable storage medium having stored thereon computer executable instructions, the computer executable instructions comprising code that, upon execution by a processor in a computing device having a display, a first component and a second component, causes the processor to:
receive a candidate sequence, the candidate sequence formed responsive to a sequence of movements of the first component relative to the second component;
control the display to provide visual representation of the movements of the first component, wherein the visual representation includes a graphical user interface element in which a column of elements is displayed;
animate the column of elements to move within the graphical user interface element responsive to the movement of the first component;
determine whether the candidate sequence matches a previously established template sequence; and
control access to the computing device.

15. The non-transitory computer readable storage medium of claim 14 wherein the graphical user interface element is divided into a plurality of sections.

16. The non-transitory computer readable storage medium of claim 14 wherein graphical user interface element is divided into two sections.

17. The non-transitory computer readable storage medium of claim 14 wherein the elements comprise any one or more of the following: numbers, letters, characters, icons, emoticons, or objects.

18. The non-transitory computer readable storage medium of claim 14 wherein the code further causes the processor to produce the column of elements in a random order.

19. The non-transitory computer readable storage medium of claim 14 wherein the movements comprise translational movements.

* * * * *